(12) United States Patent
Hausladen et al.

(10) Patent No.: US 9,282,753 B2
(45) Date of Patent: Mar. 15, 2016

(54) VENTING WINDOW

(75) Inventors: George Hausladen, Green Bay, WI (US); Rich Payne, Plymouth, WI (US)

(73) Assignee: TOMAHAWK MANUFACTURING, INC., Sheboygan, WI (US)

( * ) Notice: Subject to any disclaimer, the term of this patent is extended or adjusted under 35 U.S.C. 154(b) by 802 days.

(21) Appl. No.: 12/228,919

(22) Filed: Aug. 18, 2008

(65) Prior Publication Data
US 2010/0037785 A1 Feb. 18, 2010

(51) Int. Cl.
*A47J 43/00* (2006.01)
*A22C 7/00* (2006.01)

(52) U.S. Cl.
CPC .................................. *A22C 7/0084* (2013.01)

(58) Field of Classification Search
USPC ........... 99/473; 17/32, 45; 425/117, 253, 461, 425/465, 546, 553, 557, 812, 572–575, 55; 426/512, 513; 141/12, 71–73, 67, 87
See application file for complete search history.

(56) References Cited

U.S. PATENT DOCUMENTS

| 4,097,961 | A | * | 7/1978 | Richards ........................ 425/556 |
| 4,113,415 | A | * | 9/1978 | Holly ............................. 425/542 |
| 4,182,003 | A | | 1/1980 | Lamartino et al. |
| 4,317,259 | A | * | 3/1982 | Wagner ......................... 425/556 |
| 4,418,446 | A | | 12/1983 | Sandberg et al. |
| 6,827,111 | B1 | | 12/2004 | Tournour et al. |
| 7,014,456 | B1 | | 3/2006 | Tournour et al. |
| 7,125,245 | B2 | | 10/2006 | Hansen et al. |
| 7,210,923 | B2 | | 5/2007 | Pasek et al. |
| 7,255,554 | B2 | | 8/2007 | Lamartino et al. |
| 2005/0074515 | A1 | * | 4/2005 | Hansen et al. ................. 425/557 |
| 2006/0110510 | A1 | | 5/2006 | Tournour et al. |

* cited by examiner

*Primary Examiner* — Thien S Tran
(74) *Attorney, Agent, or Firm* — Philip M. Weiss; Weiss & Weiss

(57) ABSTRACT

A device for eliminating vacuum as the plunger is returned by venting it to the atmosphere in a patty molding machine.

4 Claims, 3 Drawing Sheets

VENTING WINDOW

FIELD OF THE INVENTION

The present invention relates to a device for eliminating vacuum as the plunger is returned by venting it to the atmosphere in a patty molding machine.

BACKGROUND OF THE INVENTION

U.S. Pat. No. 7,014,456 relates to a machine for processing individual food items which comprises a mold plate having multiple longitudinally spaced transverse rows of cavities. The mold plate slides such that the rows of cavities sequentially communicate with a fill slot in a fill plate. Bulk food material fills the cavities and displaces air from them into a breather plate. The breather plate has one or more longitudinal grooves in a working surface. The fill plate has one or more longitudinal grooves in a working surface that communicate with the atmosphere. One or more vent holes in the mold plate communicate with the breather plate and fill plate grooves for all positions of the mold plate at which food material is filling a row of cavities. No air is trapped in the breather plate and there is no buildup of air pressure that could create a friction force between the mold plate and the fill plate.

U.S. Pat. No. 7,255,554 relates to a cooling air system for a patty forming apparatus. The device has a machine base that includes an enclosing wall and contains equipment within the machines base that generates heat. The machine base includes an air inlet opening and an air outlet opening through the enclosing wall. At least one air fan is arranged to move outside air from the air inlet opening to the air outlet opening. Dampers are arranged to close the air inlet and outlet openings.

U.S. Pat. No. 7,210,923 relates to a hopper system for a patty-forming apparatus. The food product hopper of the assembly is configured for containing a supply of food product and is in flow communication with a food delivery apparatus for discharging food product from the hopper.

U.S. Pat. No. 7,125,245 relates to a tube valve arrangement for a patty-forming machine. A tube valve and manifold arrangement for switching food product pumps is incorporated into a molding machine. The tube valve includes either a central outlet or two selectable sets of progressively sized outlet openings, with the smallest outlet opening closest to the active plunger, and the largest opening furthest from the active plunger. The tube valve includes grooves or depressions formed on its outside surface. The depressions are oriented to be at least partially open to the pump cavity that is not actively filling. Grooves and bores are in fluid communication with the depressions to allow air trapped in the off line pump cavity to be expelled to the hopper. Provision is made to express air from the pump chamber during initial compression of food product within the pump chamber that is not currently feeding food product to the mold plate. The tube valve comprises an elongated cylinder that has a first inlet port and a second inlet port, the inlet ports being offset rotationally around a circumference of the cylinder, and at least one outlet port. A first depression is formed on an outside of the cylinder at least partially in registry with a first pump of the food pumps when a second pump of the food pumps is in registry with the second inlet port, and a second depression formed on an outside of the cylinder at least partially in registry with the second pump when the first pump is in registry with the first inlet port. The depressions are in fluid communication with a collection area outside of the pumps.

The compression of food product against the outside surface of the tube at a pre-filling stage, allows air trapped in the off line pump cavity to be expelled through the grooves or depressions and from the depressions through bores that are in communication with grooves formed on a surface of the pump box. The grooves formed on the surface of the pump box are in communication with the hopper. Thus, before a filling cycle begins, that is, before the corresponding inlet port of the tube valve is opened to be in registry with the inactive pump, air trapped within food product can be expelled back to the hopper.

U.S. Pat. No. 6,827,111 relates to a food processing machine with increased mold plate fill area and stroke. This patent describes the prior art as having air in the cavities forced into small holes in the breather plate and vented to the atmosphere. In the invention described in the patent, the breathing system includes passages through the breather plate, mold plate, fill plate, and top plate back to the hopper.

U.S. Pat. No. 4,418,446 relates to a mold assembly for a food patty molding machine. The mold assembly has a mold plate including at least one mold cavity, sliding reciprocally in surface-to-surface engagement between two closure plates from a fill position to a discharge position and back to a fill position. The fill slot includes a pressure relief construction. The breather plate includes a multiplicity of breather apertures connected by relief channels to two relief passages that lead back to the housing. Relief channels are also connected to passages.

U.S. Pat. No. 4,182,003 relates to a food patty molding machine incorporating a vacuum intake plunger-type food pump that pumps food product from a supply hopper into mod cavities in a reciprocating mold plate.

US patent publication No. 2006/0110510 relates to a method of processing food patties with a machine that comprises a mold plate having multiple longitudinally spaced traverse rows of cavities. The mold plate slides such that the rows of cavities sequentially communicate with a fill slot in a fill plate. Bulk food material fills the cavities and displaces air from them into a breather plate. The breather plate has one or more longitudinal grooves in a working surface. The fill plate has one or more longitudinal grooves in a working surface that communicate with the atmosphere. One or more vent holes in the mold plate communicate with the breather plate and fill plate grooves for all positions of the mold plate at which food material is filling a row of cavities. No air is trapped in the breather plate, and there is no buildup of air pressure that could create a friction force between the mold plate and the fill plate.

Meat is aspirated through the rear of the pump box during normal patty forming. The force causing the meat to be pulled back is a vacuum as the plunger returns. The design of the plunger requires that the sides have a relief area. This relief area provides space for the meat to move rearward.

SUMMARY OF THE INVENTION

A supply of bulk food material is forced under pressure from a hopper through one or more fill slots in a fill plate into individual cavities in a mold plate at a filled position. After the mold plate cavities have been filled, the mold plate slides longitudinally in a forward stroke such that the cavities lose communication with the fill plate fill slots. The mold plate slides to an eject position where the food material is dejected from the cavities in the form of individual patties. The mold plate then slides back to the fill position and the cycle repeats.

A large food material storage hopper opens into an intake of a food pump system. The food pump system includes at least two food pumps that continuously, or intermittently pump food material under pressure into a valve manifold flow connected to a cyclically operated molding mechanism. In operation, a supply of ground beef or other moldable food material is deposited into a hopper overhead. The food material is moved by supply means into an intake of plunger pumps of a pumping system. The pumps of the system operate in overlapping alteration to each other; and at any given time when the machine is in operation, at least one of the pumps is forcing food material under pressure into the intake of the manifold. The manifold comprises a path for feeding the food material under relatively high pressure into the molding mechanism.

In operation a first pump pumps moldable food material into a manifold and a second pump receives a supply of moldable food material for a subsequent pumping operation. A pump begins it pumping stroke and compresses food product in a pump cavity, forcing the moldable food material into the manifold. As operation of the molding machine continues, the pump advances a plunger to compensate for the removal of food material through the manifold.

The present invention relates to a device for eliminating vacuum as the plunger is returned by venting the air to the atmosphere. The present invention relates to a venting system which comprises a slot cut in a position near the end of the plunger's rearward travel.

In the present invention a pump box is in a typical molding position. It is an object of the present invention for the patty molding machine to comprise two plungers. One of the plungers is forward, moving the meat into a cavity. A second plunger is retracted allowing meat to be conveyed into a pump box before moving forward for compaction activity.

The plunger that was forward is then retracted. The clearance around the plunger is small. As the plunger retracts, the meat, fat and oils form a seal between the plunger and the pump box walls. As the plunger moves back, a vacuum is created and the vacuums force is progressively increased. The vacuum becomes great enough to aspirate residual meat out of the pump box manifold, past the plunger side walls and onto the top of the machine behind the pump box. Depending on the type of product, several hundred pounds of product can be aspirated in an eight hour shift.

It is an object of the present invention to provide a groove in the molding machine at the rear of the pump box. The groove vents to the atmosphere. When meat reaches this point, the vacuum is eliminated and pressure is equalized. There is no force to aspirate the meat to the back of the pump box. It is an object of the present invention for the groove to be located on the outer wall.

DETAILED DESCRIPTION OF THE INVENTION

Figure 1:
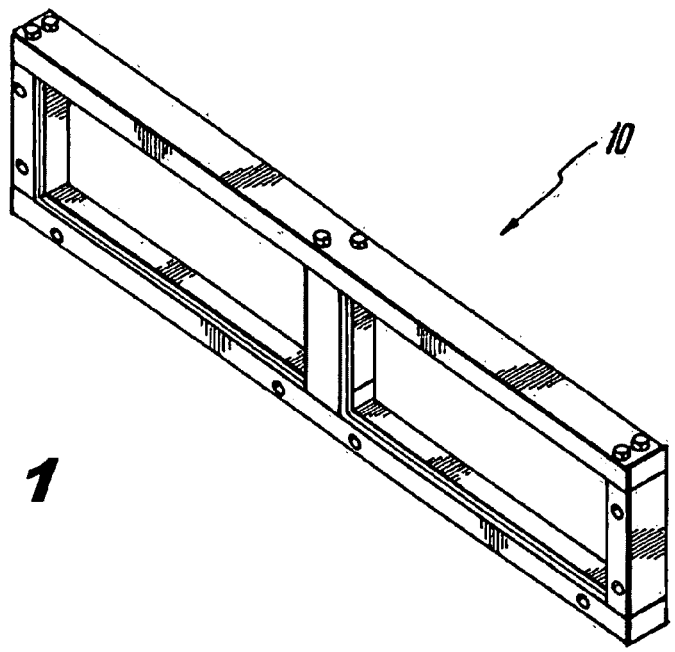
FIG. 1 shows a view of the venting window of the present invention.

FIG. 1 shows a venting window 10. The purpose of the venting window is to eliminate the vacuum as the plunger from the pump box is returned by venting the air to the atmosphere. The design for the venting window 10 is a slot cut in a position near the end of the plungers rearward travel.

Figure 2:
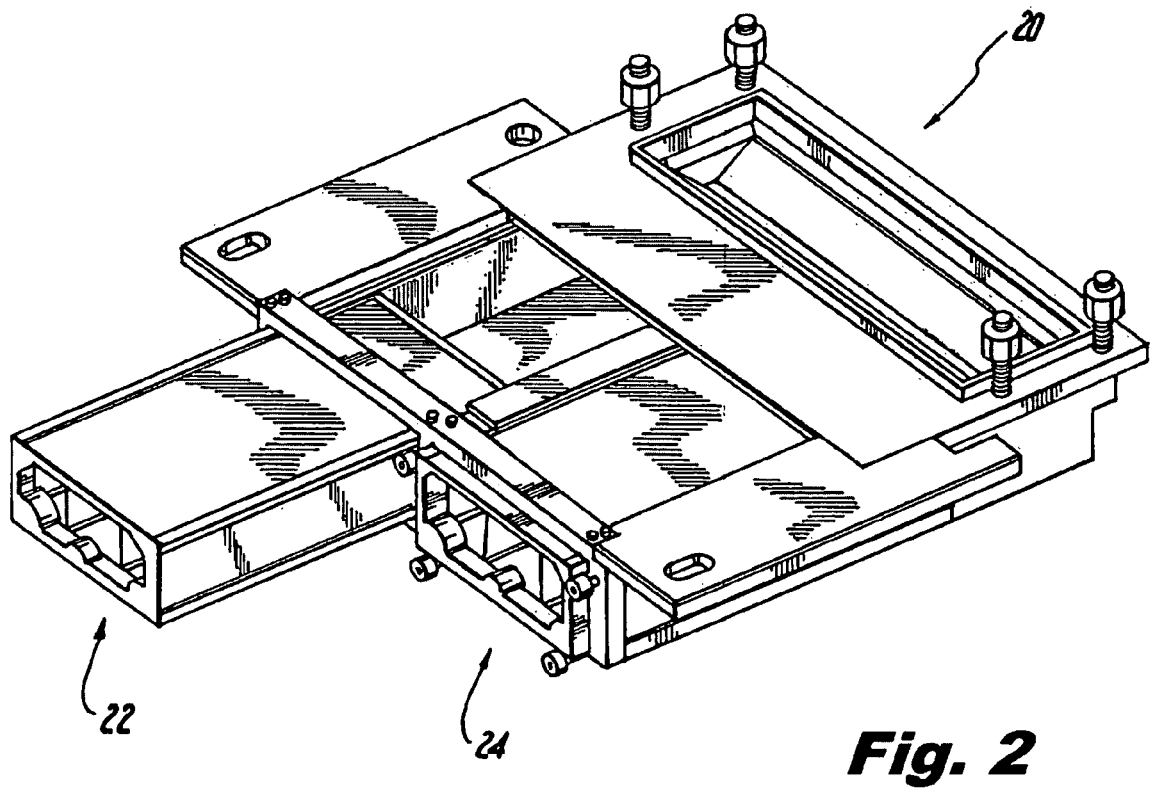
FIG. 2 shows a pump box in a typical molding position.

FIG. 2 shows the pump box 20 in a typical molding position. The right plunger 22 is moving meat into a cavity. The left side plunger 24 is retracted allowing meat to be conveyed into the pump box 20 before moving forward in the compaction activity.

Figure 3:
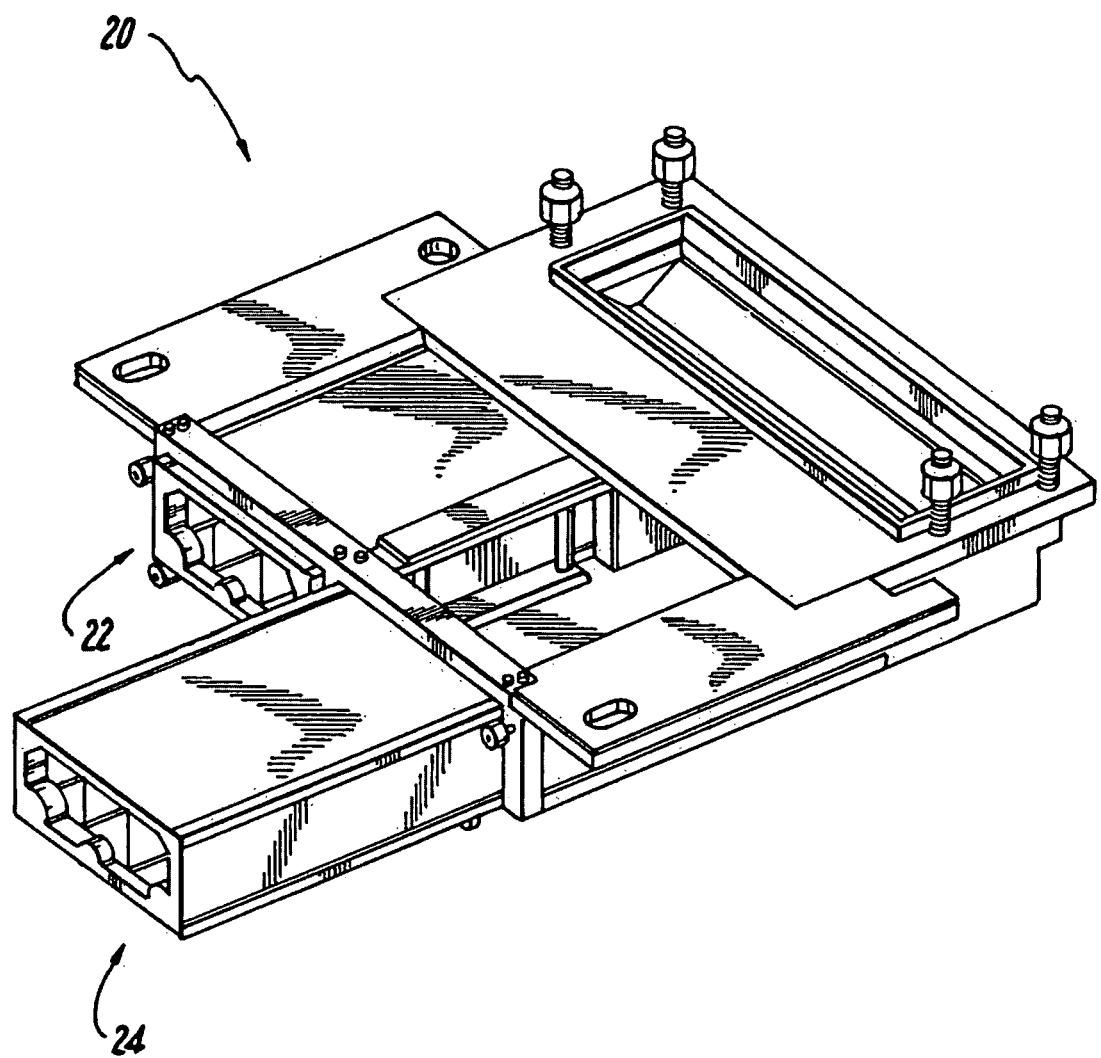
FIG. 3 shows the pump box with the right side plunger retracted.

FIG. 3 again shows the pump box 20, the right side plunger 22 is retracted. The clearance around the plungers 22 and 24 is small. As the plunger 22 retracts, the meat, fats, and oils form a seal between the plunger 22 and the pump box 20 walls. As the plunger 22 moves back, a vacuum is created and the vacuums force is progressively increased. It becomes great enough to aspirate residual meat out of the pump box 20 manifold, passed the plunger side walls and onto the top of the device behind the pump box 20. Depending on the type of products, several hundred pounds can be aspirated in an eight hour shift.

Figure 4:
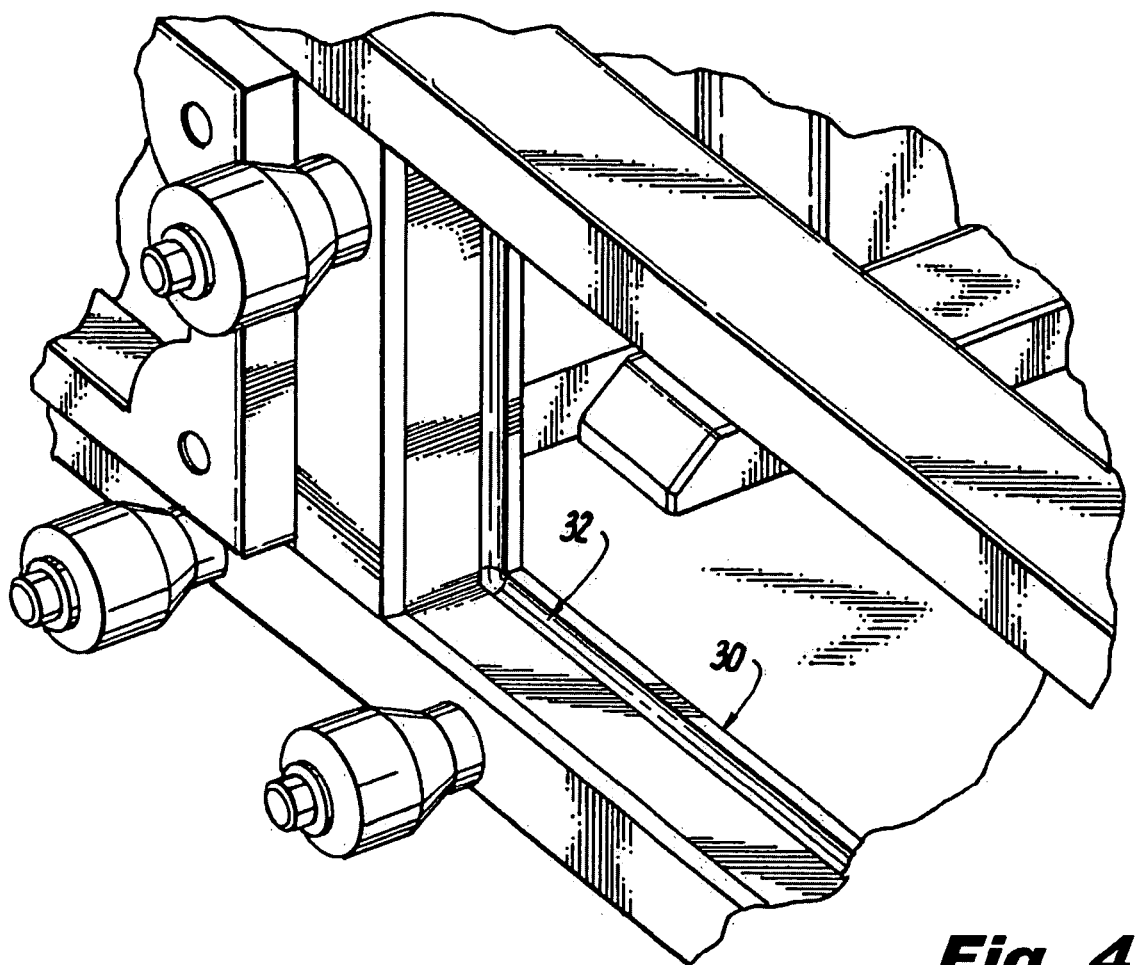
FIG. 4 shows the venting window having a groove at the rear of the pump box.

FIG. 4 shows a groove 32 located at the rear of the pump box 20. The groove is located in the window 30. The groove 32 vents air to the atmosphere. When any meat reaches this point, the vacuum is eliminated and the pressure is equalized. There exists no force to aspirate the meat to the back of the pump box 20.

Figure 5:
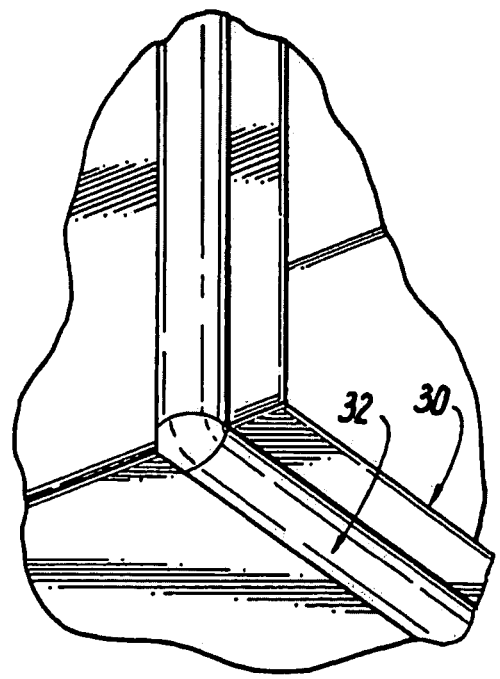
FIG. 5 shows the groove on the outer wall of the venting window.

FIG. 5 shows the groove 32 located on the outer wall of the window 30.

The invention claimed is:

1. A device in a patty molding machine for eliminating vacuum as a plunger is returned to a pump box by venting air to atmosphere outside said patty molding machine comprising:
    a food pump system;
    said food pump system comprising at least two plungers that pump food material under pressure into a valve manifold flow connected to a cyclically operated molding mechanism;
    a slot or groove cut in a window at a rear position of said pumping system;
    said groove or slot is located on an outer wall of said pump system;
    said plungers operating in overlapping alteration to each other;
    wherein said slot or groove vents air to said atmosphere outside said patty molding machine.

2. The device of claim 1 wherein in operation a first plunger pumps moldable food material into a manifold and a second pump receives a supply of moldable food material for a subsequent pumping operation.

3. The device of claim 1 wherein said food pump system consists of two plungers.

4. The device of claim 1 wherein when meat reaches said slot or groove, said vacuum is eliminated and pressure is equalized.

* * * * *